United States Patent
Stockdale

[15] 3,695,160
[45] Oct. 3, 1972

[54] FILM CARTRIDGE FOR PREVENTING THE END OF A FILMSTRIP FROM ENTERING A CARTRIDGE CHAMBER

[72] Inventor: Willis L. Stockdale, Rochester, N.Y. 14626

[73] Assignee: Eastman Kodak Company, Rochester, N.Y.

[22] Filed: Aug. 14, 1970

[21] Appl. No.: 63,879

[52] U.S. Cl. ............... 95/31 CA, 242/71.1, 242/197
[51] Int. Cl. ............................................. G03b 17/26
[58] Field of Search ............ 95/31 R, 31 CA, 31 FM; 352/78 R; 242/71.1, 71.2, 71.6, 71.8, 197

[56] References Cited

UNITED STATES PATENTS 2,559,892   7/1951   Mihalyi et al. .......... 95/31 FM
2,409,605   10/1946  Bolsey ............. 95/31 CA UX
2,629,302   2/1953   Mihalyi ................. 95/31 FM

*Primary Examiner*—Joseph F. Peters, Jr.
*Attorney*—Robert W. Hampton and D. Peter Hochberg

[57] ABSTRACT

A tooth extends forwardly from a filmstrip engaging surface of a film cartridge for entering a perforation in the trailing end of a filmstrip loaded in the cartridge to preclude the entry of the trailing end into the cartridge take-up chamber, the trailing end being thereby rendered accessible to facilitate the withdrawal of the filmstrip from the cartridge.

12 Claims, 4 Drawing Figures

PATENTED OCT 3 1972  3,695,160

WILLIS L. STOCKDALE
INVENTOR.

BY D. Peter Hochberg
Robert W. Hampton
ATTORNEYS

FILM CARTRIDGE FOR PREVENTING THE END OF A FILMSTRIP FROM ENTERING A CARTRIDGE CHAMBER

BACKGROUND OF THE INVENTION

1. Field Of The Invention

The present invention relates to film cartridges, and more particularly to means for preventing the entry of an entire length of filmstrip into a cartridge chamber. The invention further relates to means for facilitating the removal of exposed filmstrip from a film cartridge.

2. Description of the Prior Art

Film cartridges of the type disclosed in U.S. Pat. No. 3,138,081 comprise a pair of opposed, parallel film compartments having a connecting wall therebetween defining the spacing of the film compartments. These compartments include a supply compartment defining a film chamber for holding a roll of unexposed filmstrip, and a take-up compartment defining a film chamber having a rotatable core for drawing exposed filmstrip into the chamber. The connecting wall defines a forwardly facing surface (the terms forward and rearward referring to the disposition of an item relative to a camera objective when the item is used with a camera) for supporting frames of film for photographic exposure, the surface extending between passageways to the respective chambers.

Filmstrip, which can comprise superimposed webs of photosensitive film and protective backing paper, is generally initially wound in the supply chamber with its leading end (which may consist of a leader strip of the backing paper) extending across the film support surface and secured to the take-up core. In operation, the cartridge is loaded in a camera, and the camera film advance mechanism is used to rotate the take-up core to incrementally transport the film from the supply compartment, across the film support surface, and into the take-up compartment. Frames of unexposed film are exposed in sequence as they are supported on the support surface. After the exposure of the last frame of film on the roll, the camera film advance is actuated to wind the trailing end of the filmstrip into the take-up chamber so that the entire roll is contained therein. The cartridge is then removed from the camera. There is a possibility of fogging of exposed film in the take-up chamber by virtue of light entering the passageway to the chamber. Means can be provided in the camera for blocking the trailing end of the film against transport into the take-up chamber as taught by U.S. Pat. No. 3,138,084, but such means can be overridden by further actuation of the camera film advance mechanism, thereby impairing their effectiveness.

The exposed film is thereafter removed from the take-up chamber for processing. Whether the film removal operation is performed by the photographer or by a commercial film processor, the operation requires the breaking of the take-up compartment to render the exposed filmstrip accessible for the processing function. When the film removal operation is done manually, there is a likelihood that the film and paper will become entangled and that the film will be unmanageable because of its inherent tendency to twist about itself. The removal of the filmstrip by commercial processors requires the expenditure of time and money to break open the take-up compartment and to provide means for rendering the filmstrip manageable after removal to make possible the efficient processing of the film. Aforementioned U.S. Pat. No. 3,138,084 does disclose apparatus which can render the filmstrip accessible after the final exposure without necessitating the breaking of the take-up compartment, but as indicated above, the effectiveness of that apparatus is limited.

SUMMARY OF THE INVENTION

An object of the invention is to render an exposed roll of filmstrip in a film cartridge accessible for the efficient withdrawal of the film from the cartridge.

Another object is to render the trailing end of filmstrip externally accessible after the film has been wound into the take-up chamber of the cartridge.

A further object is to preclude the winding of the trailing end of a roll of filmstrip into the take-up chamber of a film cartridge regardless of actuation of a camera film transport mechanism after the exposure of the last frame of film on the filmstrip.

An additional object is to prevent the fogging of film wound in the take-up chamber of a film cartridge after the exposed frames of film have been advanced into the take-up chamber.

A still further object of the invention is to preclude the entry of the leading end of a roll of filmstrip into the supply chamber of a film cartridge.

Yet another object is to fulfill the aforesaid objects in an efficient and economical manner. Other objects will become apparent from the description to follow and from the appended claims.

According to a preferred embodiment of the invention, a film cartridge includes opposed parallel film supply and take-up compartments separated by a wall, and includes surfaces engageable by filmstrip loaded in the cartridge. These surfaces comprise the interior walls of the cartridge compartments and the forward surface of the separating wall. A tooth extends from one of the foregoing film engaging surfaces engaging a discontinuity such as a perforation near the trailing end of filmstrip loaded in the cartridge to prevent the trailing end from being wound into the take-up compartment. The tooth can advantageously be disposed on the surface defining the take-up chamber, or on that surface defining the rearward boundary of a film passageway leading to the take-up chamber. The tooth is preferably disposed near an upper or lower edge of the surface portion on which it is located so that it is alignable with a correspondingly disposed perforation in the filmstrip, whereby the trailing end of the filmstrip extends slightly beyond the take-up chamber passageway after the exposed filmstrip has been wound in the take-up chamber. The foregoing expediency both precludes the possibility of light entering the passageway when the cartridge is removed from the camera, and makes possible the grasping and pulling of the trailing end to withdraw the filmstrip from the take-up chamber.

BRIEF DESCRIPTION OF THE DRAWINGS

Reference is made to the accompanying drawings wherein.

DESCRIPTION OF THE PREFERRED EMBODIMENT

Figure 1:
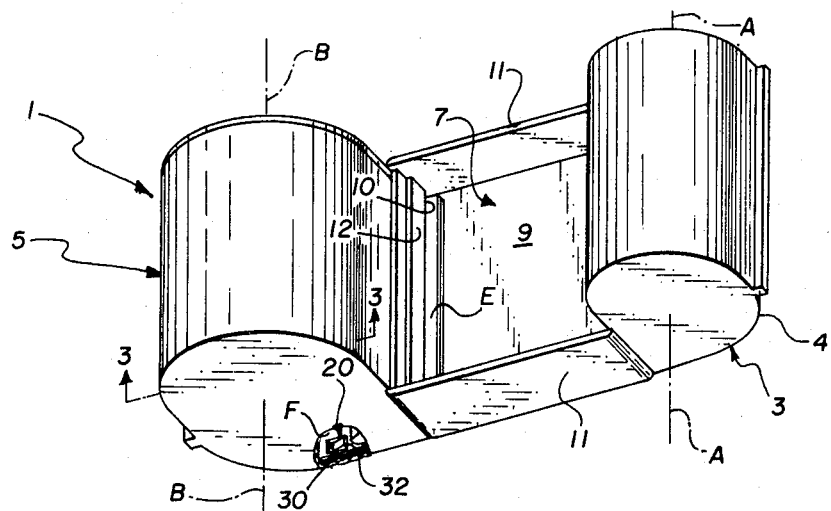
FIG. 1 is a perspective of a film cartridge according to the invention with a roll of fully exposed filmstrip wound in the take-up chamber of the cartridge, a portion of the cartridge being removed for the purpose of clarity.
Figure 2:
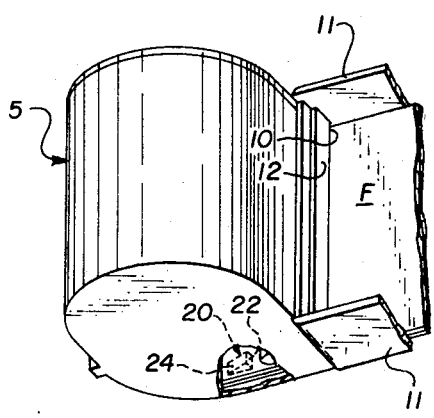
FIG. 2 is a partial perspective view of a film cartridge according to the invention with the filmstrip partially advanced into the take-up chamber.

A film cartridge 1 according to the invention is shown in FIG. 1, and includes a supply compartment 3, a take-up compartment 5, and a wall 7 interconnecting compartments 3 and 5. Compartments 3 and 5 respectively comprise an interior film supply chamber (not shown) and a take-up chamber 8 (FIG. 3) for holding filmstrip F in convolute form. Wall 7 defines a forwardly facing surface 9 for supporting frames of film for their sequential exposure by a camera. A pair of parallel opposed walls 11 perpendicular to surface 9 extends forwardly therefrom along the lateral edges of wall 7, and serve to locate cartridge 1 in a camera receiving the cartridge, to cooperate with camera structure to prevent the fogging of film on surface 9 while the cartridge is loaded in a camera, and to confine filmstrip to a prescribed path across wall 7. Thus, compartments 3 and 5 are in a parallel opposed relationship, and longitudinal axes A-A and B-B of the respective compartments are parallel with surface 9 and normal to walls 11. Filmstrip F is normally advanced from the chamber of supply compartment 3 to take-up chamber 8, leaving and entering the respective chambers through passageways in the form of slits dimensioned to accommodate the filmstrip and to preclude the leakage of light to the respective chambers when filmstrip is in the passageways, the take-up compartment passageway being designated by the numeral 10. In the normal functioning of cartridge 1, filmstrip is initially wound in the interior chamber of compartment 3 with a leading end secured to a rotatable core 13 (FIG. 3) in chamber 8 of take-up compartment 5. In response to the rotation of core 13, filmstrip is transported in single frame increments from compartment 3, across surface 9 on which the frames are sequentially exposed by the camera exposure apparatus, and wound in convolute form about core 13 in take-up compartment 5.

As indicated in each of the figures, a tooth 20 in the form of a ramp extends forwardly from a portion of wall 7 defining part of take-up chamber 8. Tooth 20 is located adjacent passageway 10. As will become apparent from the following discussion, tooth 20 could also be positioned in the passageway, on film support surface 9 between the respective passageways, or in fact on any surface which engages the trailing end portion of filmstrip F. The purpose of tooth 20 is to prevent filmstrip F from being completely wound into take-up chamber 8.

Tooth 20 is adapted to enter and engage the edges of a perforation 30 in the trailing end E of filmstrip F to preclude the displacement of filmstrip F towards chamber 8 subsequent to such engagement. Accordingly, tooth 20 comprises an abutment surface 22 extending generally normal to wall 7 and facing supply compartment 3, an inclined surface 24 oppositely disposed from surface 22, and parallel opposed side walls 26. Thus, the trailing edge 32 of perforation 30 engages tooth surface 22 after tooth 20 enters the perforation to lock filmstrip F against further advancement. The provision of inclined surface 24 makes possible the reverse movement of filmstrip F towards compartment 3 should such movement be desired.

Figure 3:
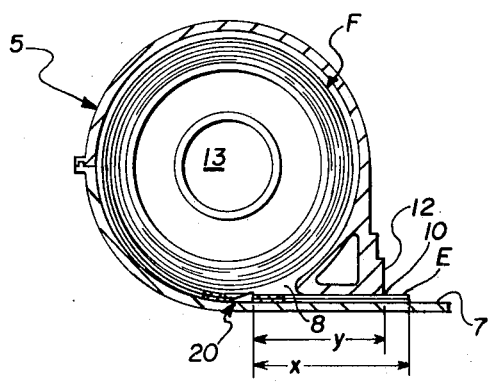
FIG. 3 is a cross sectional view taken through the line 3-3 in FIG. 1.

The purpose of tooth 20 is to prevent trailing end E of filmstrip F from entering compartment 5 as previously mentioned. Therefore, if tooth 20 is to be disposed either in passageway 10 or in chamber 8, the distance $x$ (FIG. 3) between perforation edge 32 and the trailing edge of filmstrip F must exceed the distance $y$ between abutment surface 22 and the external edge 12 of passageway 10. Of course, if tooth 20 is positioned between the passageways or in the supply compartment, distance $x$ need not be so defined. Cartridge 1 is preferably manufactured from two molded plastic components (excluding core 13), one of which includes wall 7 which extends approximately 90° around take-up compartment 5 as shown in FIG. 3. Thus, tooth 20 could advantageously be integrally molded with the component including wall 7.

Figure 4:
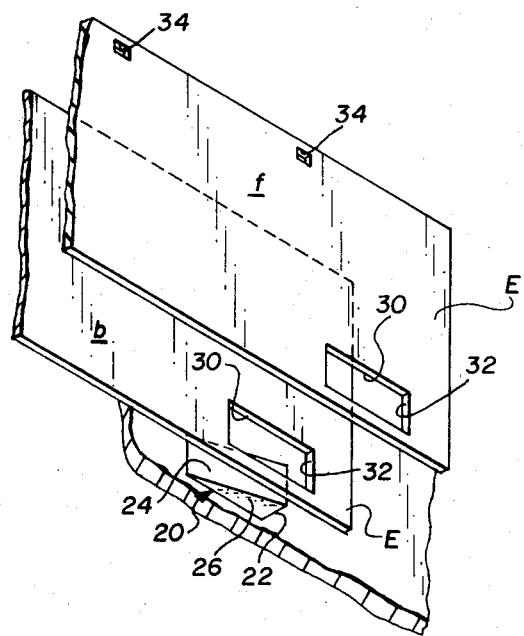
FIG. 4 is an exploded perspective view of a portion of a cartridge according to the invention.

Filmstrip F can comprise either a single strip of photographic film, or as indicated in the drawings, it can comprise a strip of film $f$ and a strip of radiation impervious backing paper $b$ superimposed therewith for protecting the film against undesired exposure. When backing paper is used and the two strips are superimposed at their trailing end portions, both strips are provided with superimposed perforations 30 of sufficient size to assure the entry of tooth 20 therein. If other perforations are also provided in filmstrip F, such as metering perforations 34 shown in FIG. 4, each perforation 30 is preferably displaced therefrom to avoid their impairment of each other's functions. Perforation 30 and tooth 20 are preferably disposed near the lateral edges of the filmstrip and film path, respectively, so that an additional length of film need not be provided for defining perforation 30, and so that the exposure area of the film need not ride over tooth 20 during the film transport process. Additionally, the lateral disposition of tooth 20 avoids any distortive influence of tooth 20 on the film exposure plane.

The functioning of cartridge 1 is simple. As explained previously, filmstrip F is incrementally advanced from the film supply chamber, across surface 9, through passageway 10, and into take-up chamber 8 in response to the (clockwise) rotation of core 13 by the camera film advance mechanism (not shown). Filmstrip F is initially wound in convolute form within supply compartment 3, and by virtue of such winding, film $f$ is imparted or "set" with a clockspringing tendency whereby the film tends to assume a coiled configuration when unwound. The film is unwound from the supply roll in a path generally concentric with the curved surface 4 of compartment 3, during the film transport process. Therefore, when the trailing end E of the film leaves the supply compartment passageway and enters surface 9, it is urged against that surface. Likewise, when perforation 30 becomes in forward alignment with tooth 20, the entry of tooth 20 is enhanced by virtue of the tendency of end E to move into engagement with the filmstrip engaging surfaces of cartridge 1. The foregoing occurrence reduces the required height of tooth 20. Hence, in response to the forward alignment of perforation 30 with tooth 20, further advancement of filmstrip F is precluded, regardless of further actuation of the camera film advancement apparatus.

The engagement of the trailing end of filmstrip F by tooth 20 assures the presence of filmstrip in passageway 10 after all of the frames on the filmstrip have been exposed, so that light is prevented from entering take-up chamber 8 when the cartridge is removed from a camera and subjected to ambient light. Moreover, end E of filmstrip F is rendered externally accessible to make possible the removal of exposed film from take-up compartment 5 without the necessity of breaking open the wall of compartment 5 as was required in the prior art. Thus, in order to remove filmstrip F from cartridge 1, trailing end E of filmstrip F is gripped and pulled to withdraw the filmstrip from chamber 8. It is possible to grip and pull only one or the other of the film f and backing paper b to withdraw both strips from the take-up chamber.

It was previously explained that tooth 20 could be disposed at various locations on the cartridge with advantageous results. A tooth could be similarly disposed in the vicinity of the passageway in supply compartment 3 for cooperating with a discontinuity such as a perforation in the leading end of the filmstrip, or at least in one component (e.g., the film) thereof, for preventing the withdrawal of that lading end into the supply compartment. The invention is not limited to the provision of a single tooth, and a plurality of teeth could be provided for cooperatively engaging the filmstrip. Of course, the tooth is not restricted to the structure shown in the drawings, and the film engaging means could be altered in light of the nature of the engageable discontinuity in the filmstrip. Furthermore, the filmstrip discontinuity need not be a perforation of the type illustrated, and could for example be a notch defined in a lateral edge of the filmstrip.

The invention has been disclosed in detail with particular reference to a preferred embodiment thereof, but it is to be understood that variations and modifications within the spirit and scope of the invention will be apparent to those skilled in the art to which the invention pertains.

I claim:

1. A film cartridge for holding filmstrip having a leading end and a trailing end, said cartridge comprising:
   a supply compartment for holding unexposed filmstrip for transport to an exposure station;
   a take-up compartment for receiving exposed filmstrip from an exposure station, said take-up compartment including a take-up chamber for holding exposed filmstrip and a passageway leading to said chamber; and
   means disposed within one of said compartments for seizing said filmstrip to prevent the trailing end of the filmstrip from entering said take-up chamber, whereby not only will the filmstrip serve as a lightlock within said passageway, but also the filmstrip will assure that the trailing end thereof can be gripped to withdraw the exposed filmstrip from the take-up chamber.

2. A film cartridge according to claim 1 for use with a filmstrip having an engageable perforation near the trailing end of the filmstrip, wherein said means disposed within one of said compartments comprises a tooth for engaging the filmstrip perforation to prevent transport of the filmstrip into the take-up chamber.

3. A film cartridge for holding for transport past an exposure station photographic filmstrip, the filmstrip having a leading end, a trailing end, and an engageable discontinuity near the trailing end, said cartridge comprising:
   a supply compartment for containing unexposed filmstrip, said supply compartment including a filmstrip supply chamber having a filmstrip engaging surface, a longitudinal axis, and a passageway leading from said chamber;
   a take-up compartment for receiving exposed filmstrip in convolute form, said take-up compartment including a filmstrip take-up chamber having a filmstrip engaging surface, a longitudinal axis, and a passageway leading to said chamber, said supply and take-up compartments being in opposed, parallel relationship;
   a wall parallel to said axes and connecting said supply and take-up compartments, said wall defining a filmstrip engaging surface extending between said passageways; and
   means on said take-up compartment filmstrip engaging surface for engaging the discontinuity in the filmstrip to prevent the transport of the filmstrip to said take-up compartment after said engagement.

4. A film cartridge according to claim 3 for use with a filmstrip in which the discontinuity is a perforation, wherein:
   said discontinuity engaging means is a tooth extending from said take-up compartment filmstrip engaging surface; and
   said tooth is positioned to engage said perforation to prevent the further transport of the filmstrip towards said take-up compartment.

5. A film cartridge according to claim 4 for use with a filmstrip bounded by opposed lateral edges with said engageable perforation adjacent one of said edges, wherein said tooth is located for engagement with the perforation prior to the transport of the trailing end of the filmstrip past said tooth.

6. A film cartridge according to claim 5 adapted to transport the filmstrip in a direction from said supply compartment to said take-up compartment, wherein said tooth is a ramp defined by an abutment surface extending generally perpendicular to said take-up compartment filmstrip engaging surface from a first lower location flush with said take-up compartment filmstrip engaging surface to a raised location, and by an inclined surface opposite said abutment surface and extending in the direction of film transport from said raised location to a second lower section flush with said take-up compartment filmstrip engaging surface, said abutment surface being engageable with the filmstrip perforation for preventing the further transport of the filmstrip to said take-up chamber after said engagement.

7. A film cartridge according to claim 5 wherein the filmstrip engaging surface of said take-up chamber has a portion adjacent said take-up chamber passageway, and said tooth is located on said portion.

8. The combination comprising:

a. a film cartridge including: a supply compartment having a filmstrip engaging surface at least partially defining both a supply chamber and a passageway leading from said supply chamber;

a take-up compartment having a filmstrip engaging surface at least partially defining both a take-up chamber and a passageway leading to said take-up chamber, said compartments and said passageways being in opposed parallel relationship;

a wall interconnecting said supply and take-up chambers and having a filmstrip engaging surface defining a film path between said passageways; and means extending from said take-up compartment filmstrip engaging surface for blocking the displacement in at least one direction of filmstrip in the cartridge; and b. filmstrip loaded in said cartridge, said filmstrip having a leading end portion and a trailing end portion, and comprising an elongate web of photographic material initially wound in convolute form in said supply chamber and being transportable through said supply compartment passageway across said wall, through said take-up compartment passageway, and wound in convolute form in said take-up chamber;

said filmstrip having a clockspringing tendency in response to being wound in said supply chamber, said clockspringing tendency imparting to the web a force urging said trailing end portion towards the portion of said filmstrip engaging surface from which said blocking means extends and into engagement with said blocking means; and said filmstrip defining a discontinuity in said trailing end portion engageable by said blocking means for precluding the displacement of said trailing end into said take-up chamber.

9. The invention according to claim 8 wherein said blocking means is a tooth extending from said take-up compartment filmstrip engaging surface, and said discontinuity is a perforation in said filmstrip, said perforation being dimensioned to receive said tooth therein for precluding the further displacement of said filmstrip towards said take-up chamber.

10. The invention according to claim 9 wherein said filmstrip comprises photographic film and radiation impervious backing paper, and said backing paper contains a perforation superimposed upon said filmstrip perforation and operable to receive said tooth therewithin.

11. The invention according to claim 9 wherein:

said perforation is displaced from the trailing end of said filmstrip by a distance greater than the distance by which said tooth is displaced from said take-up chamber passageway, so that the trailing end is accessible after said tooth engages the perforation whereby the trailing end portion of said filmstrip can be grasped and pulled to remove said filmstrip from said take-up chamber.

12. A film cartridge for holding for transport past an exposure station photographic filmstrip bounded by opposed lateral edges, the filmstrip having a leading end, a trailing end, and a perforation adjacent one of said edges and near the trailing end, said cartridge comprising:

a supply compartment for containing unexposed filmstrip, said supply compartment including a filmstrip supply chamber having a filmstrip engaging surface, a longitudinal axis, and a passageway leading from said chamber;

a take-up compartment for receiving exposed filmstrip in convolute form, said take-up compartment including a filmstrip take-up chamber having a filmstrip engaging surface, a longitudinal axis, and a passageway leading to said chamber, said supply and take-up compartments being in opposed, parallel relationship;

a wall parallel to said axes and connecting said supply and take-up compartments, said wall defining a filmstrip engaging surface which extends between said passageways and along which filmstrip may be transported from said supply compartment to said take-up compartment; and a tooth for engaging said perforation prior to the transport of said trailing end of said filmstrip past said tooth, said tooth including a ramp defined by an abutment surface extending generally perpendicular to a filmstrip engaging surface from a first lower location flush with said filmstrip engaging surface to a raised location, and by an inclined surface opposite said abutment surface and extending in the direction of film transport from said raised location to a second lower section flush with said filmstrip engaging surface, said abutment surface being engageable with the filmstrip perforation for preventing the further transport of the filmstrip towards said take-up chamber after said engagement.

* * * * *